May 4, 1937. W. J. MILLER 2,079,082
METHOD OF AND APPARATUS FOR MANUFACTURING POTTERY WARE
Filed March 16, 1934
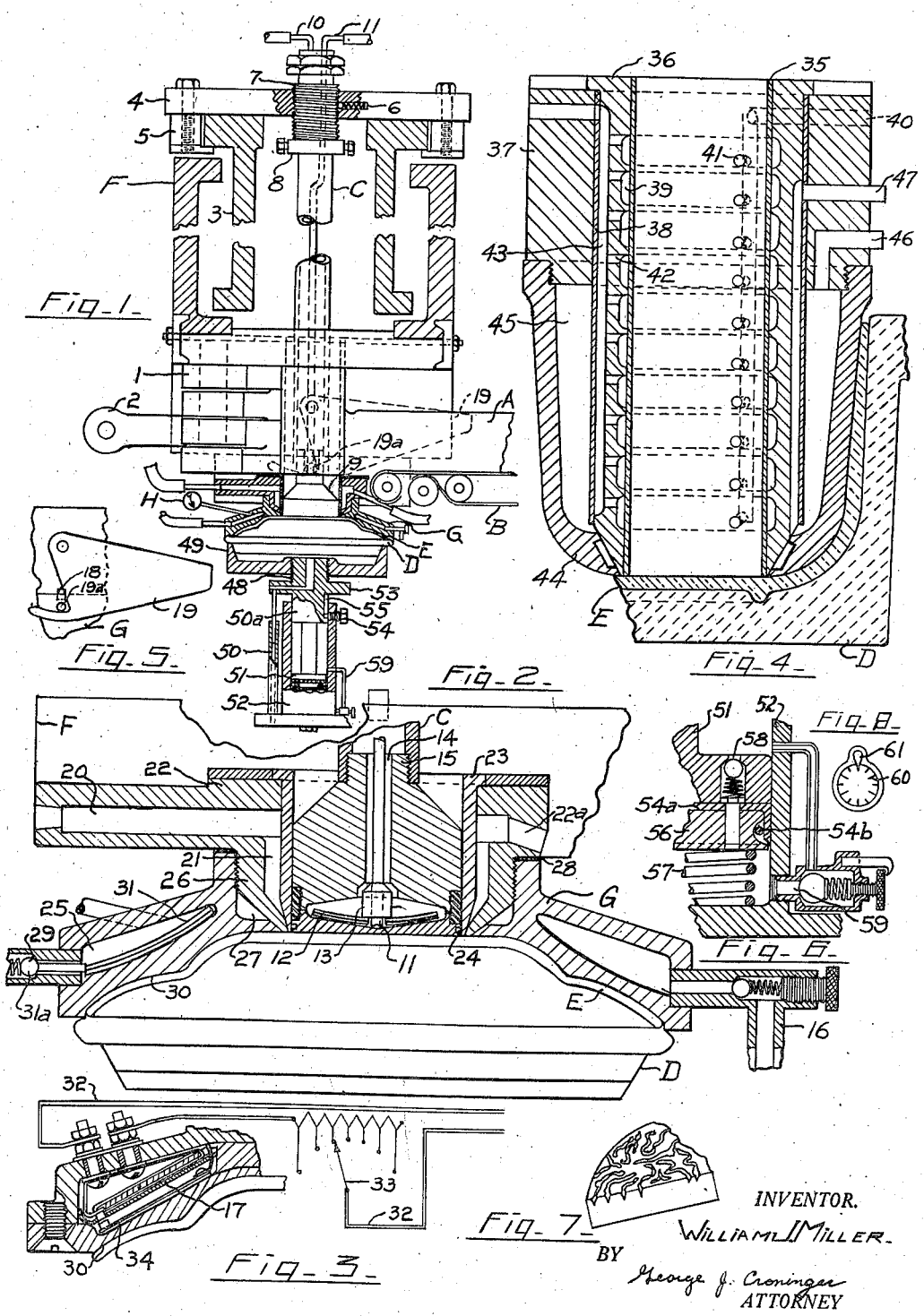

Patented May 4, 1937

2,079,082

UNITED STATES PATENT OFFICE 2,079,082

METHOD OF AND APPARATUS FOR MANUFACTURING POTTERY WARE

William Joseph Miller, Swissvale, Pa.

Application March 16, 1934, Serial No. 715,924

27 Claims. (Cl. 25—22)

This invention relates to the manufacture of high quality pottery ware such as plates, cups and saucers, heretofore made by manual jiggering processes and particularly to mechanical mass production methods and means for conveying measured charges segregated from a mass in succession to absorbent molds, applying, conforming, forming and so thoroughly securing the blank to the mold that in subsequent finishing operations, the final contouring, embellishment and polish can be successfully accomplished.

This class of ware is commonly known as "jiggered dinnerware" and as distinguished from the products of the coarser clayware arts, such as flowerpots, brick, tile, etc. has an esthetic appeal residing not only in a nicety of design but in clean attractive surfaces, free from cracks, blemishes, flaws, etc. Jiggered dinnerware is manufactured from refined clay of an adhesive and plastic nature having sufficient liquid content to promote these properties and wherever "clay" is referred to hereinafter, it will be assumed that these properties exist regardless of whatever other properties the clay may possess. This clay is of such a character that, under the normal degree of expansion occasioned during formation, it will not develop edge and body cracks of detrimental properties.

In fabricating jiggered dinnerware, the clay is applied, conformed and secured or "stuck" to an absorbent mold, the inherent "sticky" nature thereof insuring reliable adhesion for rotation in unison with the mold. This "sticking" of the clay to the mold should establish an ideal "bond", that may be considered as one wherein the degree of contact between the clay and mold, and over the total engaging surface areas thereof, is sufficient to establish and maintain a perfect state of capillarity to thereby obtain equal moisture absorption as distinguished from a defective "bond" wherein the clay in certain zones, either does not contact with the mold outright, by virtue of air entrapment or does contact but not to that degree required to establish, maintain or re-establish capillary action. This latter condition may arise upon separation of the mold from the applying means, for instance, as where the clay has not been completely released from a die and tends to separate slightly, in certain zones, from the mold, but sufficiently to destroy the state of capillarity in those regions. Any defective zone, will prevent successful jiggering of the ware, and if not torn out by the profile will create a "ripple" ahead of the tool that will progressively spread to new areas and destroy the state of capillarity there-existing. The occurrence of a defective zone, regardless of its origin results in a slower rate of drying for the affected area, over surrounding regions and the strain set up from unequal drying shrinkage develops cracks that occasion loss of the ware. The jiggered dinnerware art is sharply distinguished from the casting art wherein high class ware is produced by charging fluid clay slip into absorbent molds; from the dry pressing art wherein non-adhesive ten percent moisture content clay is pressed between non-absorbent forming dies; or from the manufacture of low grade ware such as flower pots, roofing tile, etc., from coarse, stiff form retaining only slightly adhesive unrefined clay requiring no subsequent surface enhancement and wherein one non-absorbent mold is employed.

The objects of the invention are to insure the maintaining of a perfect bond between the clay and mold by evaporating a portion of the moisture in the clay body to reliably release the clay from an applying surface without weakening, impairing or rupturing the said "bond" and to accomplish this without detrimental heat crazing or "cracking" of the exposed surface of the clay.

The invention contemplates the steps of transporting an adhesive moist charge of clay from a segregating means to the mold surface by a heated plunger and through a conduit, artificially cooled to a degree to prevent detrimental moisture evaporation either of the moisture adhering thereto or in a passing charge, scouring the conduit of moist film clay between charge passes; spreading, conforming, forming and reliably securing the charge to the mold by a die and plunger having heated forming surfaces; selectively maintaining the temperature of the surfaces at about the boiling point of water to generate steam between the die, plunger and moist blank surfaces to prevent adhesion to the die and/or plunger and insure reliable securing to the mold whilst preventing damage to the mold thru excess bulk charge application by a "hydraulic safety" on the pressing unit adapted to limit maximum pressure applied to the mold to that required to spread the charge uniformly to the ware brim and thereafter transferring the mold and blank to finishing stations for finishing the exposed surface by jiggering as with a profile to complete the ware.

The vapor generated incident to the operation of forming the charge of clay into a bat adhesively bonded to the mold acts as a repelling agent which separates the ware contacting surface of the die from the clay. An advantage of the construction lies in the fact that the die and process may be used in making bats for application to molds.

In the drawing:

Fig. 1 is a vertical longitudinal section thru a charge forming and blank shaping apparatus;

Fig. 2 is a detail in section of the die of Figure 1;

Fig. 3 is a fragmentary detail in section of an alternative means for heating the die of Fig. 1;

Fig. 4 is a vertical section thru a cup die;

Fig. 5 is a fragmentary detail of a die centering and securing assembly;

Fig. 6 is a fragmentary detail in section of the relief valve arrangement on the pressing unit of Figure 1 including dial and pointer for predetermining the maximum pressure; and Fig. 7 is a fragmentary view of a crazed blank surface avoided by this invention.

Fig. 8 is an end view of the calibrated valve control of Fig. 6.

Apparatus of Fig. 1 includes a pair of separable severing jaws 1 (one of which is shown) pivotally secured in frame F and operable by yoke 2 to segregate and preform uniform bulk charges from conditioned clay slug A intermittently advanced by belt B. Heated plunger assembly C advances charges thru cooled bushing 23 onto traveling absorbent molds D, centered and elevated by chuck 49 on pressing unit 50a thru conventional cross head and toggle arrangement (not shown). Hot die G in cooperation with a mold D forms substantially a blank conforming or molding chamber and is effective to spread and shape the charge into a thin disc-like blank E and forcibly secure the same to mold for transfer to finishing apparatus (not shown) upon mold withdrawal and discontinuance of sub-atmospheric pressure between mold and chuck.

Reciprocable cross head 3 secured to plunger plate 4 by flanged lugs 5 reciprocates plunger assembly C. Excess pressures on the plunger are relieved by release of the detent assembly 6 normally holding the plunger in desired adjusted position between limits defined by sleeve 7 and collar 8. Heated fluid as water, oil or steam, etc., admitted to chamber 9, thru inlet conduit 10, discharged thru outlet conduit 11 when spent, heats the plunger face. Bi-metallic thermostat 12 responsive to floor temperature of chamber, maintains optimum temperature conditions on plunger face by actuating closure 13 to open and close inlet fluid passage 14 in plug 15. Optionally, an adjustable needle valve (not shown) at the inlet 10 and a pressure controlled valve as at 16, Fig. 2, in the outlet will control chamber fluid circulation and temperatures according to fluid pressure therein. An alternate heating arrangement is shown in the thermostat controlled electric resistance of Fig. 3, conducting wires being led in through inlet and outlet conduits 10 and 11.

In plate die assembly G, located concentrically with the bore of jaws 1 by dowels 18 and locked in vertical position by hook 19, engaging pin 19a, cooling fluid admitted at 20 to annular chamber 21 in die base 22 surrounding plunger bushing 23 sealed at ends in base and discharged thru conduit 22a prevents temperature rise in bushing due to momentary dwell of hot plunger thus cooling and avoiding surface drying of the charge or of the thin film of clay adhering to bushing after charge passes, removed by resilient rubber ring 24 on plunger, or any remaining film not removed through imperfect wiping action.

Die 25 is threaded on insulating boss 26, air cell 27 and washer 28 acting as auxiliary insulators to avoid heat transfer to base 22 radiating from annular chamber 25, charged with heated fluid admitted under control of valve 29 and discharged through valve 16. Bi-metallic thermostats 31 maintain optimum die face temperatures by acting on spring pressed closures 31a to vary and co-ordinate input and discharge. Axially turning the valve housing adjusts lag or lead in valve action. Optionally, an adjustable needle valve may replace valve 29 and valve 16 adjusted to maintain optimum steam pressure and/or temperature in chamber 25. Alternately, predetermined contoured die face 30 may be heated by an electrical resistance element 17, Fig. 3, connected in circuit 32 manually controlled by rheostat 33 and automatically by bi-metallic thermostat element 34. Chamber temperatures may be read on a gauge H.

Optimum temperature of die and plunger faces may be defined as that of the boiling point of water (212° F.) or a few degrees thereover or that temperature, which during the normal dwell (which may be a variable) of the die and plunger whilst acting on the moist clay charge, will be sufficient to insure the generation of a separating film of steam at substantially atmospheric pressure when the applied forces on the charge are relieved yet will not induce harmful crazing and case hardening of the blank surface due to excess temperatures as shown in Fig. 7. The effect is to super heat the upper surface moisture in the blank and after the superatmospheric pressure on the blank is relieved, the vapor pressure in the moisture exceeds atmospheric and a film of steam enters the zone between the blank and adjacent die and plunger surfaces, and separates the thin adhering blank therefrom, thus insuring mold retention thereof and the preservation of the "bond" established by virtue of the inherent adhesive character of the blank pressed on the mold by the die. After the clay has been conformed to the mold and adhesively bonded thereto and the mold lowered, it is transferred to and through jiggering stations, (not shown) and the exposed surface finished by profile or other suitable instrumentality.

In producing hollow ware such as cups, I prefer the die of Fig. 4. The long plunger bushing 35 located in insert 36 in die base 37 and encompassed by sleeve 38 is cooled by circulating fluid therearound in a plurality of spaced annular conduits 39. Fluid is supplied thru conduit 40 and intercepting bores 41 to the lower level of each channel and drawn off from the upper level thru bores 42 into a common outlet conduit 43. Die base 37 is threaded on die 44 of optimum shape and heated fluid conveyed to annular chamber 45 for heating the die face thru conduit 46 and spent fluid is discharged thru 47. Temperature and pressure conditions may be regulated with the instrumentalities associated with plate die of Fig. 2.

The pressing unit for relieving the blank and/or mold of pressures in excess of those necessary to spread a charge to the mold brim, comprises a piston stem 48 supporting chuck 49 and drilled to establish fluid communication between chuck and telescoping suction or pressure fluid line 50 and an integral piston 51 working in cylinder 52 limited as to down travel by collar 53 and vertical and radial displacement by screw 54 projecting into groove 55. Fig. 6 discloses piston cup packing 54a expanding ring 54b and retainer 56 seated on weak coil spring 57. Valved bypass 58 permits downward fluid passage thru piston and valved bypass 59 diverts fluid upward around piston when mold pressure exceeds the optimum and piston and cylinder move relatively. When pressure is released, spring 57 returns piston and cylinder to normal positions shown and fluid is bypassed from above the piston to below thru 58. The effect is to offer a constant resistance to relative movement of the plunger and cylinder and not an increasing resistance as in spring releases. Optimum pressure may be varied thru calibrated thumb screw 60 arrangement provided with pointer 61 for setting.

Where in the appended claims the term "pottery ware", "dinner ware" or derivatives occurs, it shall be construed as meaning articles of household, kitchen, hotel ware and kindred lines made from semi-vitreous or vitreous china, as well as earthen ware, porcelain, stone ware, Rockingham ware, bone china, etc.

It is to be understood that I am not to be limited to the exact disclosures since various changes in construction may occur to those skillful in the art that are well within the purview and scope of this invention.

I claim:—

1. In the manufacture of high quality pottery ware, the method of separating a clay body from an engaging surface to which it normally would adhere to insure retention thereof by another engaging surface to which it adheres which consists in superheating moisture in the body and vaporizing the same.

2. In the manufacture of dinnerware, the method which comprises, charging a mold with clay, applying pressure to the clay to conform it to the mold and secure it thereto, and applying heat to the clay to generate a gaseous fluid from the moisture therein to offset forces tending to impair the bond between the clay and mold upon release of pressure.

3. In the manufacture of dinnerware, the method comprises, charging a mold with clay, applying pressure to the clay to conform and secure it to the mold together with heat to superheat moisture in the clay, releasing the pressure and vapourizing the moisture to offset forces tending to detach the clay from the mold to insure retention thereof by the mold, and thereafter finishing the exposed surface of the clay.

4. In the manufacture of dinnerware, the method which comprises, charging a mold with clay, securing and conforming the clay to the mold by pressing with a heated forming member, the temperature, dwell period and/or pressure being at a value below that which would detrimentally affect the clay but sufficient to superheat the moisture in the clay; releasing the pressure and vapourizing the moisture to separate the forming member from the clay without impairing the bond between the mold and clay to insure retention thereof on the mold and thereafter finishing the exposed surface of the clay.

5. In the manufacture of dinnerware, the method which comprises, charging a mold with clay, pressing the clay against the mold to conform and completely secure it thereto, applying heat to a surface of the clay incident to pressing to insure complete retention thereof on the mold, and thereafter finishing the exposed clay surface.

6. In the manufacture of dinnerware, the method which comprises, charging a mold with clay, securing and conforming the clay to the mold by pressing, insuring the adhesive retention of the clay on the mold by vapourizing a portion of the moisture in the clay and thereafter profiling the surface of the clay defining the zone of vapourization.

7. In the manufacture of dinnerware, the method which comprises, charging a mold with clay, securing and conforming the clay to the mold by pressing the clay thereagainst, insuring the retention of the clay on the mold by vapourizing a portion of the moisture in the clay without detrimentally affecting the surface of the clay and thereafter jiggering the clay on the mold.

8. A method of fabricating dinnerware comprising, charging a mold with clay, pressing the clay against the mold with a heated die to conform and secure the same thereto, vapourizing a portion of the moisture in the clay to release the die and insure retention of the clay on the mold, withdrawing the mold incident to release of pressure to assist in separating the clay from the die and thereafter finishing the exposed surface of the clay.

9. In the manufacture of dinnerware, the method which consists in molding a clay body to predetermined shape in a forming chamber and releasing the body from a wall of the chamber by heating and vaporizing a fluid within the chamber.

10. In the manufacture of dinnerware, the method which consists in pressing a clay body between co-operable surfaces to expand and conform the body to at least one of the surfaces, and maintaining the body in associated relation with one of the surfaces by heating a fluid incident to pressing in the zone of the other surface and vaporizing the same incident to separation of the surfaces.

11. In the manufacture of dinnerware on absorbent molds from plastic clay the method which comprises, pressing a clay body against a mold to adhesively bond the clay thereto in the presence of heat at a temperature value below that which would promote drying out of the clay beyond a depth to which the clay is normally profiled and vaporizing extracted moisture to overcome forces which would otherwise impair the adhesive bond between the mold and clay and thereafter jiggering the clay to remove material from the zone of moisture extraction.

12. In the manufacture of jiggered dinnerware on absorbent molds, the method of forming clay bodies for jiggering which comprises, pressing a mass of clay between co-operable forming surfaces to expand the same to full jiggering size, applying heat to the clay through one of the surfaces to insure retention of the clay by the other surface, regulating the temperature and pressure applied to the clay incident to expanding to preclude impairment of the surface exposed to heat for subsequent jiggering, and thereafter jiggering the clay.

13. Apparatus for producing dinnerware which comprises, in combination, means for receiving a clay body, means co-operable with the first named means for pressing the body therebetween, said body normally adhering to at least one of said means and fluid means for separating said body from the pressing means said fluid being generated from the moisture in said body.

14. Apparatus for producing dinnerware blanks from clay charges which comprises means for receiving a clay charge, means co-operable with the first means for pressing the charge therebetween and means for generating a gaseous fluid from the moisture in the blank to separate the body from one means, said body adhering to the other means.

15. In apparatus for producing dinnerware, means comprising a mold for receiving a clay charge, a die co-operable therewith for pressing the charge against the mold, means associated with the die for heating the moisture in the clay to the vaporization point to thereby separate the die from the clay, said clay adhering to said mold.

16. In apparatus for producing dinnerware, a mold for receiving a clay charge which adheres thereto, a die for pressing said body against said mold, means for heating said die to induce moisture vaporization in the charge in the zone of the die to thereby release the body from the die and heat responsive means for controlling said first named means.

17. In apparatus for producing pottery ware, a means for receiving a charge and to which the charge adheres, a die for spreading the charge on the first named means said die comprising a body portion having a chamber therein for the reception of a heated fluid to raise the die temperature to a degree to induce moisture evaporation in the charge, means for controlling the input and outflow of heated fluid said construction being of such a nature that the vapor separates the charge from the die, said charge adhering to said mold.

18. Apparatus for fabricating dinnerware comprising, in combination, a heated die, a mold adapted to receive a clay charge, a support for said mold movable relative to said die, means for preventing disassociation of the mold and support, thereby characterized that the clay is pressed between the die and mold and secured to the mold whilst a portion of the moisture therein is vapourized to release the die, said mold being withdrawn from co-operation with the die by said support incident to vapourization to assist in releasing the die.

19. Apparatus for producing dinnerware which comprises, in combination, co-operable molding surfaces for shaping a clay body, means for charging one of said surfaces with clay, means for heating the other of said surfaces to generate a vapour between said surface and said clay and means for moving at least one of said surfaces relative to the other.

20. Apparatus for manufacturing dinnerware in or on molds which comprises, in combination, forming means co-operable with said molds for shaping a clay body therebetween under pressure, means for heating said forming means and means for varying the heat and pressure applied to said clay.

21. Apparatus for manufacturing dinnerware in or on molds which comprises, in combination, a surface for co-operation with the mold for forming a clay mass therebetween under pressure, elevating means for moving said mold relative to said surface, means associated with said elevating means for varying the pressure applied to said clay, means for heating said surface and means for varying the temperature of said surface.

22. In apparatus for the manufacture of dinnerware on molds from plastic clay, the combination which comprises, a mold adapted to receive a clay mass, means for applying heat and pressure to said mass to bond said mass to said mold and generate a vapor from the moisture in said mass and means for controlling the degree of heat and pressure applied to said mass to thereby predetermine the percentage of moisture vaporized.

23. In apparatus for the manufacture of potteryware, a mold and supporting means including an hydraulic piston, releasable in response to predetermined pressure on said mold and means for varying the instant of movement of said piston.

24. In apparatus for the manufacture of potteryware, a mold adapted to receive a charge of plastic clay, a die for spreading said clay, a pressing unit for centering and elevating said mold comprising a centering chuck, a piston, a cylinder in which said piston reciprocates, a substantially incompressible liquid supporting said piston and means for discharging said liquid on application of a predetermined pressure downward on said mold and resilient means for urging said piston in one direction to return said piston to normal position and means for bypassing fluid from one side of said piston to the other as said piston moves.

25. In apparatus for the manufacture of pottery ware, a mold adapted to receive a charge of plastic clay, a die for compressing said clay, a pressing unit for centering and elevating said mold comprising a piston and cylinder in which said piston works, means for conducting a fluid from one side of said piston, valve means for controlling the initiation of release of fluid said valve means being operable in response to pressure conditions on said mold.

26. In apparatus for the manufacture of pottery ware, a mold adapted to receive a charge of plastic clay, a die for co-operation with the mold, a pressing unit for elevating said mold into co-operation with said die to press the clay and wherein pressure is exerted on the mold, said pressing unit comprising a piston and a cylinder wherein said piston reciprocates, means for bypassing fluid from one zone of said cylinder to the other as relative movement occurs between said piston and cylinder, pressure controlled valve means for controlling the by-pass adjustable to open when the pressure on the mold exceeds that necessary to spread clay to the brim zone of the mold.

27. Apparatus for forming clay bats which comprises, in combination, means for receiving a charge of material on which the bat is formed, a bat forming member for co-operation therewith to press and spread out the bat therebetween, means for heating the clay contacting surface of the bat forming member to thereby repel the bat forming member from the clay by generating a vapor from the moisture in the clay.

WILLIAM JOSEPH MILLER.